United States Patent Office 2,934,435
Patented Apr. 26, 1960

2,934,435
PROCESS FOR PREPARING A FLAVORING SUBSTANCE

Charles Gerard May, St. Neots, England, assignor to Lever Brothers Company, New York, N.Y., a corporation of Maine No Drawing. Application October 2, 1957
Serial No. 687,617

Claims priority, application Great Britain October 5, 1956

20 Claims. (Cl. 99—140)

The present invention relates to artificial flavoring substances and to their preparation.

By the reaction of an amino reagent comprising cysteine or cystine with a furan compound, flavoring substances capable of imparting a savory odor or taste to foodstuffs, especially a meat-like taste, can be prepared.

The present invention provides, therefore, a process for the preparation of a flavoring substance which comprises reacting an amino reagent comprising cysteine or cystine with a furan compound in the presence of water and at an elevated temperature.

The furan compound may be furan itself or it may be a substituted furan. Preferred compounds are 2-substituted furans. It may be desirable to use a furan compound with a free alpha position.

Suitable substituent groupings are carbon containing groups linked to the furan ring through a carbon atom, such as a hydrocarbon group, whilst nitrogenous substituents such as an amino group may be present. Suitable substituent groupings are alkyl, aldehyde, alcohol and carboxyl groupings. Substituent groups in the furan ring should not, however, interfere with the reaction nor impart undesirable properties to the flavoring substance.

Examples of furan compounds which may be used according to the invention are:

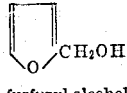
furfuryl alcohol

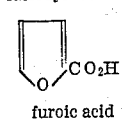
furoic acid

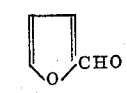
furfuraldehyde

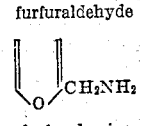
furfurylamine

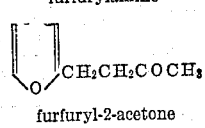
furfuryl-2-acetone

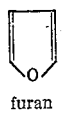
furan

Furfuraldehyde is the preferred compound and should be freshly distilled before use. Other furan compounds which may be derived from pentoses and pentosans are also preferred.

Flavoring substances according to the invention may be obtained by using an amino reagent comprising (a) cysteine or cystine. Cysteine and its derivatives are preferred to cystine and its derivatives, whilst mixtures of cysteine and cystine may be used if desired. In addition to cysteine or cystine the amino reagent should preferably also contain (b) arginine or glutamic acid or proline. The acids of component (b) may be used singly, or in combination.

Preferred flavors are obtained by using at least one acid from each of components (a) and (b) in admixture with one or more, preferably three or more, other amino acids such as glycine, alpha- and beta-alanine, threonine, lysine, leucine, iso-leucine, serine, valine and histidine.

It is not essential to use individual amino acids. Salts, such as monosodium glutamate, simple compounds, such as esters or hydroxy compounds, peptides, such as glutathione, or proteins which will give rise to the desired amino acids under the conditions of reaction may be used. Both racemic and naturally occurring forms of the amino acids may be used.

In particular it has been found that fish protein is a suitable starting material for obtaining a mixture of amino acids for the reaction, provided that cysteine or cystine is added. Crude fish protein, such as cod flesh, may be used, but preferably, the fish should first be deflavored. The fish protein is then hydrolyzed, for instance, by means of hydrochloric acid or caustic soda, and substantially neutralized. The substantially neutralized hydrolyzate may be used, as such, as the amino reagent, provided cysteine or cystine is added. The hydrolyzate must be treated, for instance, with charcoal, in order to remove phenylalanine and methionine, whilst cysteine or cystine or a source thereof must be added before using the mixture. The presence of substantial amounts of phenylalanine or of methionine in mixtures tend to give rise to undesirable floral or potato-like aromas and non meat-like flavors. Small amounts of other aromatic amino acids such as tyrosine and tryptophan may not be objectionable but large amounts should preferably be avoided. Other protein hydrolyzates which have been suitably treated to remove phenylalanine and methionine such as groundnut hydrolyzate or casein hydrolyzate or mixtures of these may also be used as the amino reagent, provided cysteine or cystine or a source thereof is added.

Factors which may affect the nature and quality of the flavor produced include the nature and relative amounts of the furan and amino reagents used, the amount of water present and the time and temperature of heating. Thus, to obtain a product having a savory flavor particularly resembling that of meat the amino reagent should preferably contain about 1–4 times, by weight of the weight of cysteine and cystine present, of amino acids additional to cysteine and cystine, or amounts of derivatives such as will give rise to an equivalent weight of such acids.

If desired, a proportion of pentose sugars, in particular ribose, may be included in reaction mixtures according to the invention. Inclusion of such pentoses generally results in reaction products which impart flavors having a greater resemblance to that of beef. Excessive amounts of pentose sugars, however, may impart excessive sweetness to the flavoring substance.

As little as 0.05 mole of furan compound per 1 mole of amino reagent may give a satisfactory flavoring substance. By "amino reagent" is meant the total amino acids and derivatives thereof present, inclusive of cysteine and cystine. Amounts of furan up to 0.75 mole per 1 mole of amino reagent may be used but greater amounts may be objectionable. About 0.5 mole of furan per 1 mole of amino reagent is preferred.

The amount of water present should preferably be at least 5, generally 15 to 25, times the amount, by weight, of the furan reagent. Amounts of up to 1500 times may, however, be used.

The pH at which the reaction is carried out is not critical although the pH of the mixture at the end of the reaction should preferably not be alkaline. It is preferred to carry out the reaction at a pH of between 2 and 7.

The reaction mixture may be in the form of a solution or in the form of a slurry or sludgy mass, depending on the concentration of reagents and on the conditions of heating. In order to reduce any danger of charring, any solid reagent should be brought into solution to as great an extent as possible. Stirring of the mixed reagents may be advisable during heating to reduce the danger of local over-heating. Vigorous stirring during heating may reduce the time required for completion of the reaction.

The reaction may be carried out by heating the mixture under reflux. In many cases the mixture is maintained at its boiling point for from ½ to 4 hours, generally at least for 1 hour. It is desirable that refluxing should not be continued for more than about 12 hours. Similar results may be achieved by heating for a longer period at a lower temperature, for instance 90° C. when about 18 hours heating is necessary, 70° C. when 24 to 30 hours heating may be required, or at a lower temperature for an even longer time. The process may also be carried out under reduced pressure or under increased pressure when lower or higher temperatures will be necessary to maintain the mixture at or near its boiling point. A reflux condenser is normally fitted to the reaction vessel whilst the reaction is in progress. Conditions of heating should be such as to avoid substantial caramelization of the mixture. Any unreacted furan compound should preferably be removed at the end of the reaction.

The reaction may also be carried out by adding the reagents to a food product in which it is desired to incorporate a savory or meat-like flavor and heating the product to effect reaction, for instance by autoclaving in a sealed can. When carrying out the reaction by adding the reagents to a food product it may be necessary to add a small amount of water, but generally such products will already contain sufficient water to enable the reaction to proceed. Care should be taken to avoid the presence of excess furan compound in the food product.

The reaction products may be used as such, or they may be converted to powders; for instance, by freeze drying. Such powders may tend to be hygroscopic.

Flavoring substances according to the invention may be incorporated in a wide range of meat or meat-like products. They may, for example, be incorporated either as solutions or powders, as is convenient, in protein gels, in luncheon meats, in dry soup mixes and in meat spreads and similar products.

The flavoring substances may be used in food products where a savory flavor is required and they may be used to enhance the flavor of meat-containing products.

It is preferred to let the flavoring substance age for about 3–5 days after its preparation, when optimum flavor is generally developed. The flavoring substance may tend to lose quality after about 3 weeks from its preparation. In the absence of air and light the substance or products in which it has been incorporated tend to retain their quality of flavor longer. Freeze-dried powders generally retain quality of flavor for a longer period than solutions.

The following examples illustrate the invention.

*Example 1*

| | Gm. |
|---|---|
| Water | 200 |
| DL-cysteine | 6 |
| Furfuraldehyde | 5 |
| Arginine | 1.6 |

The above mixture was heated for 3 hours in a round-bottomed flask fitted with reflux condenser in an oil bath at 130° C. At the end of this time the reflux condenser was removed and heating carried out for a short time in order to remove unreacted furfuraldehyde. After cooling, and storage of the product in a closed vessel for two days it had a savory meat-like flavor.

*Example 2*

Deflavored cod flesh (30 grams) was hydrolyzed by refluxing with 6 N-hydrochloric acid (200 grams) for 8 hours. The acid was substantially distilled off at reduced pressure and the residual hydrolyzate after addition of water was filtered and brought to pH 6.7 with caustic soda. The dark colored solution was then passed through a short column (3″ x 2″) of activated charcoal giving a water-white solution. This solution (300 cc. containing 4.2 mg. of Kjeldahl nitrtogen/cc.) was then heated to boiling, under reflux, for 3 hours after adding furfuraldehyde (5 g.) and L-cysteine (6 g.). The excess furfuraldehyde was removed by heating the flask without reflux condenser for a short time and the contents cooled to room temperature and stored for several days in a closed vessel. A savory meat-like flavor developed during this time.

*Example 3*

The following ingredients were mixed and heated, under reflux, for 3 hours in an oil bath at 130° C.

| | |
|---|---|
| L-cysteine | gm 6 |
| Deflavored cod fish hydrolyzate (prepared as in Example 2) | mls 300 |
| D-ribose | gm 1 |
| Furfuraldehyde | gm 4 |

After 3 hours the reflux condenser was removed and heating continued for a short while in order to remove unreacted furfuraldehyde. The resulting solution had a taste and aroma resembling that of meat.

*Example 4*

The following ingredients were mixed and heated, under reflux, for 3 hours in an oil bath at 130° C.

| | |
|---|---|
| L-cysteine | gm 6 |
| Deflavored cod fish hydrolyzate | mls 300 |
| Furoic acid | gm 5 |

After storage for a few days in a closed vessel the resulting solution had a taste and aroma resembling that of meat.

*Example 5*

The following ingredients were mixed and heated under reflux, for 3 hours in an oil bath maintained at 130° C.

| | |
|---|---|
| 2-furfuryl acetone | gm 5 |
| Deflavored cod fish hydrolyzate (prepared as in Example 2) | mls 300 |
| L-cysteine hydrochloride | gm 6 |

The solution obtained had a savory taste and aroma.

*Example 6*

The following ingredients were heated under reflux in an oil bath which was maintained for 30 hours at 80° C.

| | |
|---|---|
| Furfurylamine | gm 5 |
| Deflavored cod fish hydrolyzate (prepared as in Example 2) | mls 500 |
| L-cysteine hydrochloride | gm 6 |

The resulting solution had a savory aroma and taste.

I claim:

1. A process for the preparation of a meat flavor which comprises heating, in the presence of water at an elevated temperature, an amino reagent comprising an amino acid selected from the group consisting of cysteine and cystine with a furan compound selected from the group consisting of furan and furan substituted in the 2-position by a radical of the group consisting of alkyl, substituted alkyl, aldehyde, alcohol and carboxyl groups, the heating being continued until a meat-like flavor develops.

2. A process for the preparation of a meat flavor which comprises heating, in the presence of water at an elevated temperature, an amino reagent which comprises an amino acid selected from the group consisting of cysteine and cystine and at least one additional amino acid selected from the group consisting of proline, glutamic acid and arginine with a furan compound selected from the group consisting of furan and furan substituted in the 2-position by a radical of the group consisting of alkyl, substituted alkyl, aldehyde, alcohol and carboxyl groups, the heating being continued until a meat-like flavor develops.

3. The process of claim 2 wherein the amino reagent additionally contains at least three amino acids selected from the group consisting of glycine, alpha and beta alanine, threonine, leucine, lysine, iso-leucine, serine, valine and histidine.

4. A process according to claim 1 in which the furan compound has a free alpha position.

5. A process according to claim 1 in which the furan compound is furan itself.

6. A process according to claim 1 in which the furan compound is a 2-substituted furan.

7. A process according to claim 1 in which the furan compound is a 2-hydrocarbon substituted furan.

8. A process according to claim 1 in which the furan compound is furfuraldehyde.

9. A process according to claim 2 in which the furan compound is a 2-substituted furan.

10. A process according to claim 2 in which the furan compound is furfuraldehyde.

11. A process according to claim 1 in which the amount of water present is at least 5 times by weight of the weight of furan compound.

12. A process according to claim 2 in which the amount of water present is at least 5 times by weight of the weight of furan compound.

13. A process according to claim 1 in which from 0.05 to 0.75 moles of furan compound per 1 mole of amino reagent is used.

14. A process according to claim 2 in which from 0.05 to 0.75 moles of furan compound per 1 mole of amino reagent is used.

15. A process according to claim 1 which is carried out at a pH of between 2 and 7.

16. A process according to claim 1 in which the reaction is carried out by heating the mixture under reflux.

17. A process according to claim 1 wherein the amino acid is cysteine.

18. A process according to claim 2 wherein cysteine is the amino acid selected from the group consisting of cysteine and cystine.

19. A process of incorporating a meat-like flavor in a food product which comprises adding an amino reagent comprising an amino acid selected from the group consisting of cysteine and cystine and a furan compound selected from the group consisting of furan and furan substituted in the 2-position by a radical of the group consisting of alkyl, substituted alkyl, aldehyde, alcohol and carboxyl groups, to the food product and heating the food product in the presence of water, until a meat-like flavor develops.

20. A process for the preparation of a flaxoring substance having a meat-like flavor which comprises heating an amino reagent comprising an amino acid selected from the group consisting of cysteine and cystine and at least one amino acid selected from the group consisting of proline, glutamic acid and arginine with a furan compound selected from the group consisting of furan and furan substituted in the 2-position by a radical of the group consisting of alkyl, substituted alkyl, aldehyde, alcohol and carboxyl groups, the molar ratio of furan compounds to amino reagents being within the range from 0.05 to 0.75:1, in the presence of water at an elevated temperature, the amount of water present being at least 5 times by weight of the weight of furan compound, the heating being continued until a meat-like flavor develops.

References Cited in the file of this patent

UNITED STATES PATENTS

| 1,617,412 | Miner | Feb. 15, 1927 |
| 2,103,495 | Ruckdeschel | Dec. 28, 1937 |
| 2,816,834 | Ruskin | Dec. 17, 1957 |

FOREIGN PATENTS

| 107,367 | Great Britain | Mar. 18, 1918 |

OTHER REFERENCES

"The Chemical Senses," by Moncrieff, Leonard Hill Limited, 17 Stratford Place, W.I., London, 1944, pp. 104 and 271.

"The Chemistry and Technology of Food and Food Products," second edition, by Jacobs, vol. I, Interscience Publishers, Inc., New York, 1951, pp. 209 and 215.